United States Patent [19]

Russ, Sr.

[11] 4,365,965

[45] Dec. 28, 1982

[54] V-BLOCK BELT

[75] Inventor: Paul E. Russ, Sr., Littleton, Colo.

[73] Assignee: The Gates Rubber Company, Denver, Colo.

[21] Appl. No.: 184,712

[22] Filed: Sep. 8, 1980

[51] Int. Cl.³ .............................................. F16G 5/16
[52] U.S. Cl. ................................... 474/244; 474/201
[58] Field of Search ............... 474/201, 240, 242, 244, 474/245; 156/139

[56] References Cited

U.S. PATENT DOCUMENTS

| | | | |
|---|---|---|---|
| 2,403,607 | 7/1946 | Ogard | 474/242 |
| 2,663,194 | 12/1953 | Ogard | 474/242 |
| 3,949,621 | 4/1976 | Beusink | 474/242 |
| 4,177,687 | 12/1979 | Russ | 474/242 |
| 4,303,403 | 12/1981 | Lamers | 474/242 |
| 4,303,404 | 12/1981 | Moore | 474/242 |

FOREIGN PATENT DOCUMENTS

| | | | |
|---|---|---|---|
| 62996 | 1/1914 | Austria | 474/242 |
| 2224021 | 10/1974 | France | 474/242 |
| 569750 | 6/1945 | United Kingdom | 474/242 |

Primary Examiner—Lawrence J. Staab
Attorney, Agent, or Firm—H. W. Oberg, Jr.; C. H. Castleman, Jr.; Raymond Fink

[57] ABSTRACT

A V-block belt with transversely extending ribs and sockets in each V-block that interdigitate with each other in successive blocks to enhance belt torsional rigidity.

4 Claims, 5 Drawing Figures

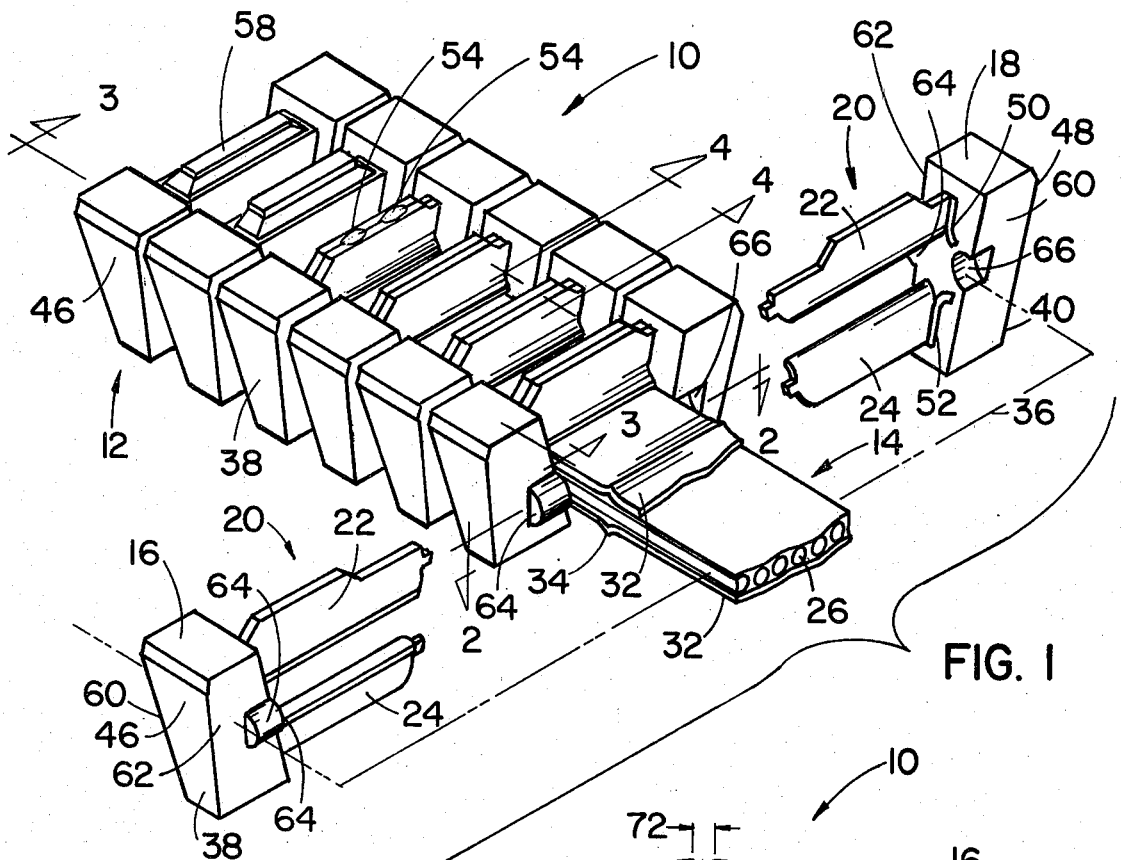
FIG. 1
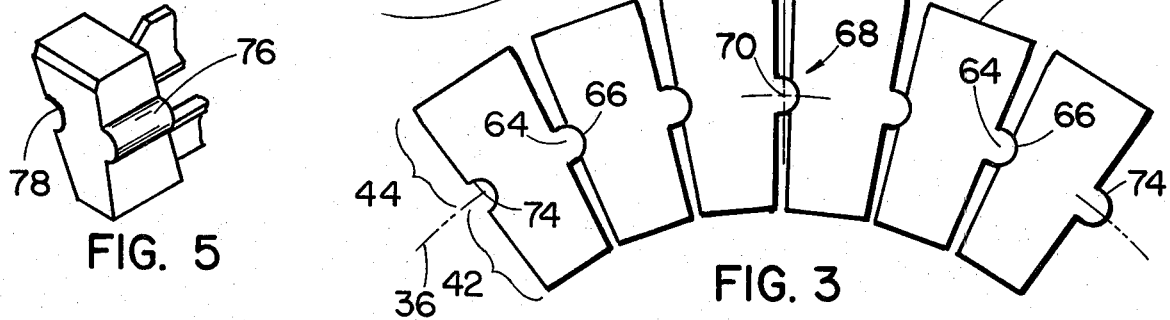
FIG. 5 · FIG. 3
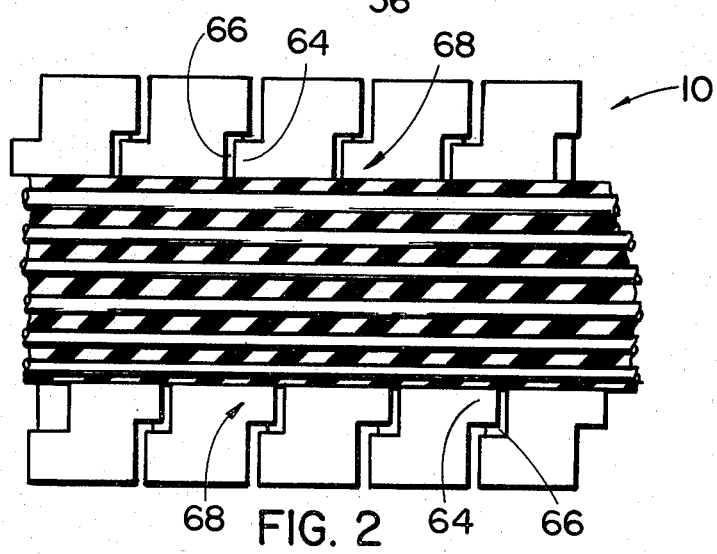
FIG. 2
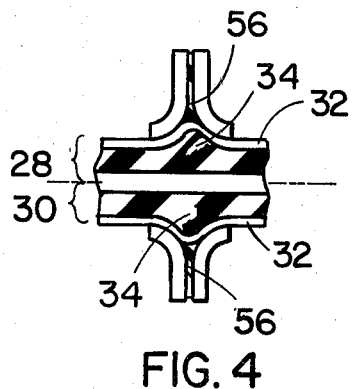
FIG. 4

V-BLOCK BELT

BACKGROUND OF THE INVENTION

The invention relates to machine elements and mechanisms, but more particularly, the invention relates to V-block belts.

V-block belts are extensively used as variable speed belts because their construction allows a low thickness to width ratio to accomodate desirable speed ratios changes in variable speed belt drives. Such belts are usually constructed with a flat band type load carrying member that establishes an equatorial plane about which bending takes place. V-blocks are longitudinally spaced and attached to the load carrying member such as by clamping or molding. Examples of clamped-type belts appear in U.S. Pat. Nos. 1,446,018; 2,343,367 and 2,647,410. U.S. Pat. No. 4,177,687 teaches how to solve many horsepower/torque problems of clamped-type V-block belt by using a molded polymeric material around diagonal side members of a reinforcement that surrounds and supports the load carrying member.

Block belts may be extremely flexible in torsional bending because of the thinness of the flat load carrying member spanning successive blocks. Lack of torsional rigidity may allow the V-blocks to cock as they enter a pulley which may introduce or aggravate belt vibration between pulleys. U.S. Pat. No. 1,446,018 teaches how to inhibit belt back bending in one direction of belt travel with successive plates that each extends from the top of one V-block and tangentially over the load carrying member portion between successive blocks. While such a construction may also add some degree of torsional stability to a block belt, the system is only partially operative because there can only be an increase in the belt torsional stiffness when the plates are in tangential contact with the load carrying member. Torsional rigidity is decreased as the plates move away from the load carrying member as when the blocks enter a pulley or in free span vibration between pulleys.

SUMMARY OF THE INVENTION

In accordance with the invention, a V-block belt is provided which inhibits successive V-blocks from rotating about the belt longitudinal axis which thereby enhances torsional rigidity of the belt. In a preferable embodiment, elastomeric portions are molded around diagonal side members of reinforcements that are attached to and longitudinally spaced from each other along a flat band type load carrying member. Each elastomeric portion forms a V-side with a frictional driving surface that projects below, and optionally above, an equatorial plane of the load carrying member. Each elastomeric portion has two oppositely facing sides interconnecting a common V-side, the oppositely facing sides oriented transversely to the load carrying member. One of the sides has a rib and the oppositely facing side has a rib-receiving socket, the rib and socket juxtaposed and oriented transversely to the load carrying member. The ribs and rib-receiving sockets between successive blocks are positioned to interdigitate with each other and define a means for enhancing torsional rigidity of the belt.

The advantages of the invention will be apparent after reviewing the drawings and description thereof wherein:

FIG. 1 is an exploded isometric partial view of a V-block belt of the invention;

FIG. 2 is a partial view taken along the line 2—2 of FIG. 1 showing ribs and rib-receiving sockets interdigitating and wherein some cross hatching is omitted for clarity;

FIG. 3 is a view taken in the direction 3—3 of FIG. 1 but showing the belt in front bending with interdigitating ribs and rib-receiving sockets and wherein cross hatching is omitted for clarity;

FIG. 4 is a partial cross-sectional side view taken along the line 4—4 of FIG. 1; and FIG. 5 is a partial view of a block element similar to those shown in FIG. 1 but showing an alternate form of the invention.

DESCRIPTION OF PREFERRED EMBODIMENT

The means for enhancing torsional rigidity feature of the invention may be used with several types of V-block belts such as those in the clamped category of U.S. Pat. No. 2,343,367 or in the surrounding reinforcement and molded category of U.S. Pat. No. 4,177,687. A belt of the latter category is used to illustrate the invention. In the figures, the belt 10 has a plurality of V-blocks 12 attached to a load carrying member 14 which preferably is of the flat band type. Each V-block has two elastomeric portions 16, 18 that are integrally molded around a diagonal side member (not shown but as in U.S. Pat. No. 4,177,687) of a U-shaped reinforcement 20 having two spaced and substantially parallel leg members 22, 24. The load carrying member has a tensile reinforcement such as a spiraled cord 26 positioned between layers 28, 30 of an elastomeric matrix that may contain other fibrous reinforcement such as a woven fabric 32. The load carrying member may be preformed with transversely oriented ribs 34 adapted for meshing with rib-engaging portions of the leg carrying member. Optionally, the ribs may be post-formed in a subsequent molding operation as taught in the '687 patent after the blocks are assembled. The tensile reinforcement defines an equatorial plane 36 of the belt about which belt bending takes place.

The elastomeric portions form V-sides defining frictional driving surfaces 38, 40 and may be made with any suitable elastomer or plastics such as natural and synthetic rubbers, phenolics, urethanes and blends thereof. Fibrous reinforcement may optionally be embedded in the elastomeric portions to improve structural integrity. The frictional driving surfaces extend below 42 and optionally, but preferably, above 44 the equatorial plane as part 46, 48 of a V-side.

Each elastomeric portion has two leg member receiving cavities 50, 52 molded juxtaposed and oriented with the leg members of the reinforcement. The belt is assembled by sliding and pressing two leg members from opposite directions over the load carrying member so that the leg members penetrate the molded cavities. When the load carrying member is premolded with spaced transverse ribs along its exterior inner and outer surfaces, the rib-engaging portions of the leg members are placed to engage the ribs. Molded cavities grip the penetrating leg portions and hold them in transverse alignment until the so-assembled components can be more rigidly attached together such as by spot welding 54, adhesive bonding 56, or embedding the assembled leg members in an elastomeric matrix 58. With the latter type of attachment, ribs may be simultaneously formed in the load carrying member by placing the assembled components and uncured load carrying members in a multi-cavity mold with additional elastomer and then pressurizing the load carrying member as described in U.S. Pat. No. 4,177,687.

Each elastomeric portion of a block component has two oppositely facing sides 60, 62 that interconnect with a V-side and are oriented to extend transversely to the load carrying member. One interconnecting side has a rib 64 and the oppositely facing interconnecting side has a rib-receiving socket 66 that are oriented transversely in relation to the load carrying member. Preferably, the ribs and rib-receiving sockets are integrally molded in the elastomeric portion juxtaposed and at the equatorial plane of the load carrying member. The V-blocks are dimensioned so that they are in close proximity when they are assembled on the load carrying member so that the ribs and sockets of successive V-blocks interdigitate 68 with each other and define a means for enhancing torsional rigidity of the belt.

As shown in FIG. 3, the rib and socket have an axis 70 located substantially midway 72 between successive blocks to define pivot points and more preferably, the rib and sockets have cylindrical surface portions 74.

The rib 64 and socket 66 may partially extend across the oppositely facing sides as shown in FIG. 1 or the rib 76 and socket 78 extend entirely across said sides as shown in FIG. 5.

In use, the sockets and interdigitating ribs of successive blocks enhance belt torsional rigidity by transferring torsional loads to successive block members.

The foregoing description is made for purpose of illustration only and is not intended to limit the scope of the invention which is to be determined from the appended claims.

What is claimed is:

1. In a power transmission belt of the type having a plurality of V-blocks attached to a load carrying member, each block having two elastomeric portions that form two V-sides with frictional driving surfaces, the improvement in the elastomeric portion comprising:

two oppositely facing sides interconnecting with a V-side and oriented transversely to the load carrying member, one of the oppositely facing sides having an integrally molded rib and the other oppositely facing side having an integrally molded rib-receiving socket, the rib and socket each having generally cylindrical surface portions juxtaposed and oriented transversely to the load carrying member and ribs and sockets of successive V-blocks interdigitating with each other and defining pivot points and means for enhancing torsional rigidity of the belt.

2. The power transmission belt as claimed in claim 1 where the ribs and sockets are located generally along an equatorial plane of the load carrying member.

3. The power transmission belt as claimed in claim 1 wherein the ribs and sockets have an axis located substantially midway between successive blocks that define the pivot points.

4. A block component for a V-block belt having a flat band type load carrying member and diagonal side member reinforcements projecting above and below the load carrying member juxtaposed V-sides of each block, the component comprising:

an elastomeric block for attaching to the diagonal side member and having a side defining a friction drive surface that interconnects two oppositely facing sides oriented to be transverse of the load carrying section, one of the oppositely facing sides having an integrally molded rib and the other oppositely facing side having an integrally molded rib-receiving socket, the rib and socket having generally cylindrical surface portions located to be juxtaposed the load carrying member, and together, defining pivot points and means for interdigitating with other similarly configured elastomeric blocks to enhance torsional rigidity of an assembled block belt.

* * * * *